(12) United States Patent
Wolf et al.

(10) Patent No.: US 11,566,700 B2
(45) Date of Patent: Jan. 31, 2023

(54) MEASURING ARRANGEMENT FOR LUBRICANT

(71) Applicant: ZF Friedrichshafen AG, Friedrichshafen (DE)

(72) Inventors: Daniel Wolf, Friedrichshafen (DE); Christian Riess, Wangen (DE); Umit Kutluay, Friedrichshafen (DE); Andreas Vath, Leidersbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/280,198

(22) PCT Filed: Aug. 12, 2019

(86) PCT No.: PCT/EP2019/071550
§ 371 (c)(1),
(2) Date: Mar. 26, 2021

(87) PCT Pub. No.: WO2020/064199
PCT Pub. Date: Apr. 2, 2020

(65) Prior Publication Data
US 2022/0042592 A1    Feb. 10, 2022

(30) Foreign Application Priority Data
Sep. 27, 2018  (DE) .................. 10 2018 216 618.8

(51) Int. Cl.
*F16H 57/04*    (2010.01)
*F16C 33/66*    (2006.01)
(Continued)

(52) U.S. Cl.
CPC ......... *F16H 57/0479* (2013.01); *F16C 17/02* (2013.01); *F16C 33/103* (2013.01);
(Continued)

(58) Field of Classification Search
CPC ............. F16H 57/0479; F16H 57/0405; F16H 57/0419; F16H 57/0427; F16H 57/043;
(Continued)

(56) References Cited

U.S. PATENT DOCUMENTS 3,722,967 A * 3/1973 Lewis ................. F16C 33/6685
384/466
3,895,689 A * 7/1975 Swearingen ............ F16C 17/04
184/6.16
(Continued)

FOREIGN PATENT DOCUMENTS

CN          205042436 U  *  2/2016
CN          105822679 A  *  8/2016
(Continued)

*Primary Examiner* — Sherry L Estremsky
(74) *Attorney, Agent, or Firm* — Leydig, Voit & Mayer, Ltd.

(57) ABSTRACT

A system includes a bearing, a lubricant line, a vessel and a sensor. The lubricant line is designed to introduce lubricant from a bearing gap of the bearing into the vessel. The sensor is designed to measure at least one physical variable of lubricant that is situated in the vessel. The vessel includes an outlet or overflow. The system includes a lubricant sump and a device for introducing lubricant from the sump into the bearing gap of the bearing.

18 Claims, 2 Drawing Sheets

(51) Int. Cl.
 *F16C 17/02* (2006.01)
 *F16C 33/10* (2006.01)
(52) U.S. Cl.
 CPC ....... *F16C 33/6685* (2013.01); *F16H 57/043* (2013.01); *F16H 57/0405* (2013.01); *F16H 57/045* (2013.01); *F16H 57/0419* (2013.01); *F16H 57/0427* (2013.01); *F16H 57/0447* (2013.01); *F16H 57/0471* (2013.01); *F16C 2233/00* (2013.01); *F16C 2361/61* (2013.01)
(58) Field of Classification Search
 CPC ............... F16H 57/0447; F16H 57/045; F16H 57/0471; F16C 17/02; F16C 33/103; F16C 33/6685; F16C 2233/00; F16C 2361/61
 See application file for complete search history.

(56) References Cited

U.S. PATENT DOCUMENTS

| | | | |
|---|---|---|---|
| 5,749,660 A * | 5/1998 | Dusserre-Telmon | ........................ F16C 19/166 384/475 |
| 6,261,003 B1 * | 7/2001 | Dusserre-Telmon | ... F16C 33/58 384/475 |
| 6,550,258 B1 | 4/2003 | Shoulders | |
| 9,267,596 B2 * | 2/2016 | Trost | ................... F16H 57/0471 |
| 11,052,758 B2 * | 7/2021 | Eschenburg | ........ F16H 57/0457 |
| 2009/0247348 A1 | 10/2009 | Haupt et al. | |
| 2011/0274383 A1 | 11/2011 | Frydendal | |
| 2013/0074630 A1 | 3/2013 | Jaervinen et al. | |
| 2014/0363290 A1 | 12/2014 | Jacobsen | |
| 2018/0313154 A1 * | 11/2018 | Walker | ................ F16H 57/0486 |

FOREIGN PATENT DOCUMENTS

| | | | | |
|---|---|---|---|---|
| DE | 10259142 A1 | 9/2003 | | |
| DE | 102008000900 A1 | 10/2009 | | |
| DE | 102011082856 A1 | 3/2013 | | |
| DE | 102011056093 B3 | 4/2013 | | |
| DE | 102015220723 A1 | 1/2017 | | |
| DE | 102015118203 A1 | 4/2017 | | |
| DE | 102019108528 A1 * | 10/2020 | | |
| EP | 0030275 A1 * | 6/1981 | | |
| EP | 1235991 B1 * | 8/2004 | .......... B21B 31/076 |
| EP | 1710432 A1 | 10/2006 | | |
| EP | 2385248 A1 | 11/2011 | | |
| JP | 2004108451 A * | 4/2004 | ........ F16H 57/0479 |
| JP | 2018028290 A | 2/2018 | | |
| KR | 1020130027814 A | 3/2013 | | |
| KR | 20130032290 A * | 4/2013 | | |
| WO | WO-2010001479 A1 * | 1/2010 | ............. F03D 80/70 |

* cited by examiner

MEASURING ARRANGEMENT FOR LUBRICANT

CROSS-REFERENCE TO PRIOR APPLICATIONS

This application is a U.S. National Phase Entry under 35 U.S.C. § 371 of International Application No. PCT/EP2019/071550, filed on Aug. 12, 2019, and claims priority to German Patent Application No. DE 10 2018 216 618.8, filed on Sep. 27, 2018. The International Application was published in German on Apr. 2, 2020 as WO 2020/064199 A1 under PCT Article 21(2) and is hereby incorporated by reference.

BACKGROUND

Solutions for measuring physical variables of bearings by means of sensors are known from the prior art. For this purpose, the sensors are integrated into the bearing. For example, publication KR 20 130 027 814 describes a plain bearing with an integrated temperature sensor. The temperature sensor is inserted in a bore of an outer bearing shell, such that its measuring tip is directly adjacent to a running surface of the bearing.

SUMMARY

In an embodiment, a system includes a bearing, a lubricant line, a vessel and a sensor. The lubricant line is designed to introduce lubricant from a bearing gap of the bearing into the vessel. The sensor is designed to measure at least one physical variable of lubricant that is situated in the vessel. The vessel includes an outlet or overflow. The system includes a lubricant sump and a device for introducing lubricant from the sump into the bearing gap of the bearing.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

Figure 1:
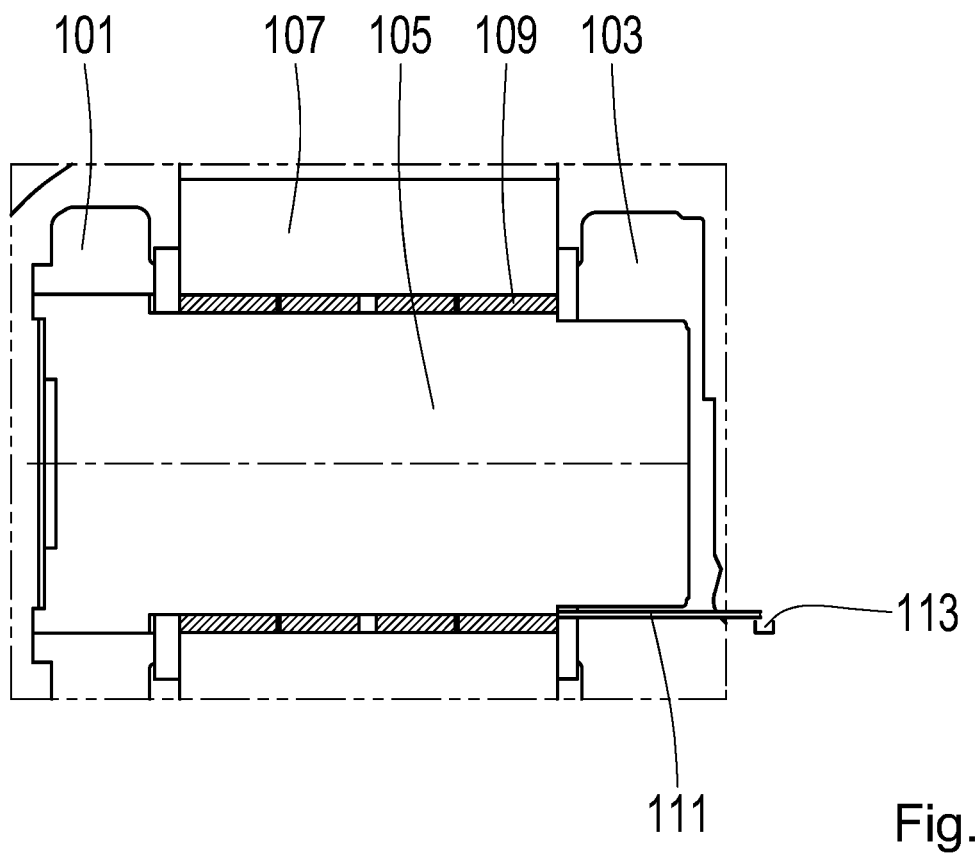
FIG. 1 shows an arrangement having a collecting ring.

In order to integrate a sensor into a bearing, corresponding installation space must be available. The measurement of planetary bearings in a rotating planetary carrier is particularly problematic since the installation space conditions are very narrow here. In addition, the sensors also rotate with the planetary carrier. This can make it necessary to transmit a measurement signal from the rotating planetary carrier to an evaluation unit fixed to the housing. Corresponding rotary transmission or telemetry equipment is susceptible to interference and expensive.

Various embodiments eliminate the disadvantages inherent in the solutions known from the prior art. In particular, physical variables of a bearing are to be measured reliably and cost-effectively.

The arrangement (also called "system") includes a bearing, a lubricant line, a vessel and a sensor. The lubricant line has two orifices, which connect them to one another in a lubricant-conducting manner. The vessel is a means for collecting a liquid. In the present case, the vessel serves to collect lubricant. A sensor is a means for measuring at least one physical variable.

The lubricant line is designed to introduce lubricant from a bearing gap of the bearing into the vessel. A first orifice of the lubricant line is in lubricant-conducting communication with the bearing gap, such that lubricant from the bearing gap enters the first orifice. The lubricant line directs the lubricant from the first orifice to a second orifice. There, the lubricant exits and enters the vessel.

The bearing has at least two bearing rings, each of which forms at least one bearing raceway and can be rotated relative to one another. The bearing gap runs between the bearing raceways. The bearing gap is at least partially filled with lubricant. If the bearing is a plain bearing, the bearing raceways slide against one another directly or via a lubricant film. In the case of a roller bearing, rolling elements are located in the bearing gap and roll on the bearing raceways.

The sensor is designed to measure at least one physical variable of lubricant that is situated in the vessel, that is, lubricant collected in the vessel. The physical variable is a quantitatively determinable property of the lubricant. For example, it can be a temperature, viscosity, electrical property or particle content of the lubricant.

The vessel is spatially decoupled from the bearing and can be arranged in a fixed position. This simplifies the measurement of the physical variable of the lubricant that is situated in the vessel.

Since the lubricant has been discharged from the bearing via the lubricant line, conclusions can be drawn regarding the state of the bearing on the basis of the measurement of the physical variable of the lubricant that is situated in the vessel. In order to obtain sufficiently meaningful measurement results, it is appropriate to arrange the first orifice of the lubricant line in a region of the bearing in which the bearing is at the highest load at a nominal operating point.

In an embodiment, in order to regulate a level of the lubricant that is situated in the vessel, the vessel has an outlet or overflow. The lubricant is conducted out of the vessel via the outlet or overflow.

An outlet is located at the bottom of the vessel. In order to regulate the amount of lubricant discharged, the outlet preferably has a throttle or a switchable valve.

An overflow discharges the lubricant from the vessel if a level of the lubricant exceeds a threshold.

In an embodiment, a lubricant sump and a device for introducing lubricant from the lubricant sump into the bearing gap of the bearing are provided. "Lubricant sump" refers to a reservoir of oil that forms a starting and ending point of a lubricant circuit and is different from the aforementioned vessel. In the present case, the bearing is also integrated into the lubricant circuit. The lubricant circuit is initiated by the device for introducing the lubricant into the bearing. The device can be a pump, for example, whose suction side is connected in a lubricant-conducting manner to the lubricant sump and whose pressure side is connected in a lubricant-conducting manner to the bearing gap of the bearing.

In an embodiment, the outlet or overflow is arranged in such a way that lubricant that exits the vessel via the outlet or overflow enters the lubricant sump. In this way, the lubricant circuit described above is closed.

Disclosed embodiments are suitable for monitoring bearings that are not arranged in a manner fixed to the housing. Bearings of this type can be found in planetary carriers. Accordingly, in an embodiment, the aforementioned bearing is a planetary bearing. According to the embodiment, the arrangement further includes a planetary carrier and a planetary gear. The planetary gear is rotatably supported in the planetary carrier by means of the bearing. In particular, the planetary carrier can also be rotatably mounted. The planetary carrier forms at least a part of the lubricant line, or at least a part of the lubricant line is fixed to the planetary carrier.

Since the specified part of the lubricant line also rotates with the planetary carrier, a device that establishes a lubricant-conducting connection between the part of the lubricant line rotating with the planetary carrier and the vessel, which may be arranged in a manner fixed to the housing, can be required. In an embodiment, this takes place by means of a collecting device and a lubricant-conducting connection from the collecting device to the vessel. The collecting device is arranged such that it collects lubricant, which exits the lubricant line, at at least one rotational angle position of the planetary carrier. In particular, the collecting device can be arranged in such a way that, in the at least one rotational angle position, it is located below an orifice of the at least one part of the lubricant line from which lubricant exits. The exiting lubricant then drips into the collecting device due to gravity and from there is introduced into the vessel via the lubricant-conducting connection. The collecting device is preferably funnel-shaped or designed as a channel.

In an embodiment, at least a part of the lubricant line consists of a thermally insulating material, for example plastic. This is particularly advantageous if the temperature of the lubricant that is situated in the vessel is to be measured. A lubricant line consisting of a thermally insulating material prevents the lubricant from cooling down and thus falsifying the measurement results.

An embodiment provides for lubricant to be discharged from the bearing gap of the bearing at different points and introduced into different vessels in order to obtain different measurement results for the different positions. The arrangement is correspondingly additionally formed with a further lubricant line, a further vessel and a further sensor. The further lubricant line is designed to introduce lubricant from the bearing gap of the bearing into the further vessel. The further sensor is designed to measure at least one physical variable of lubricant that is situated in the further vessel.

In planetary carriers having a plurality of planetary gears, the individual planetary gears are preferably monitored individually. A preferred further development provides for the use of a single vessel for a plurality of bearings. In the case of slowly rotating gearboxes, such as wind turbine gearboxes, the measurement can be carried out individually for each bearing by designing the outlet in the form of a throttle or by switching a valve. Alternatively, a mean value is calculated. A switchover or cyclic change can be made between these measurement modes, in order to detect the deviation of a single bearing from the average.

In an embodiment, the lubricant lines of different bearings lead to different collecting vessels, each of which is assigned a sensor. With the measurement of a plurality of physical states, any parallel or series connection of the collecting vessels can be implemented. Bearing temperatures, for example, are recorded individually for each bearing by directing exiting oil into separate collecting vessels. Subsequently, the oil from all the collecting vessels is conducted to a downstream collecting vessel in order to measure another physical value of the oil, such as the particle rate for all the bearings.

Figure 2:
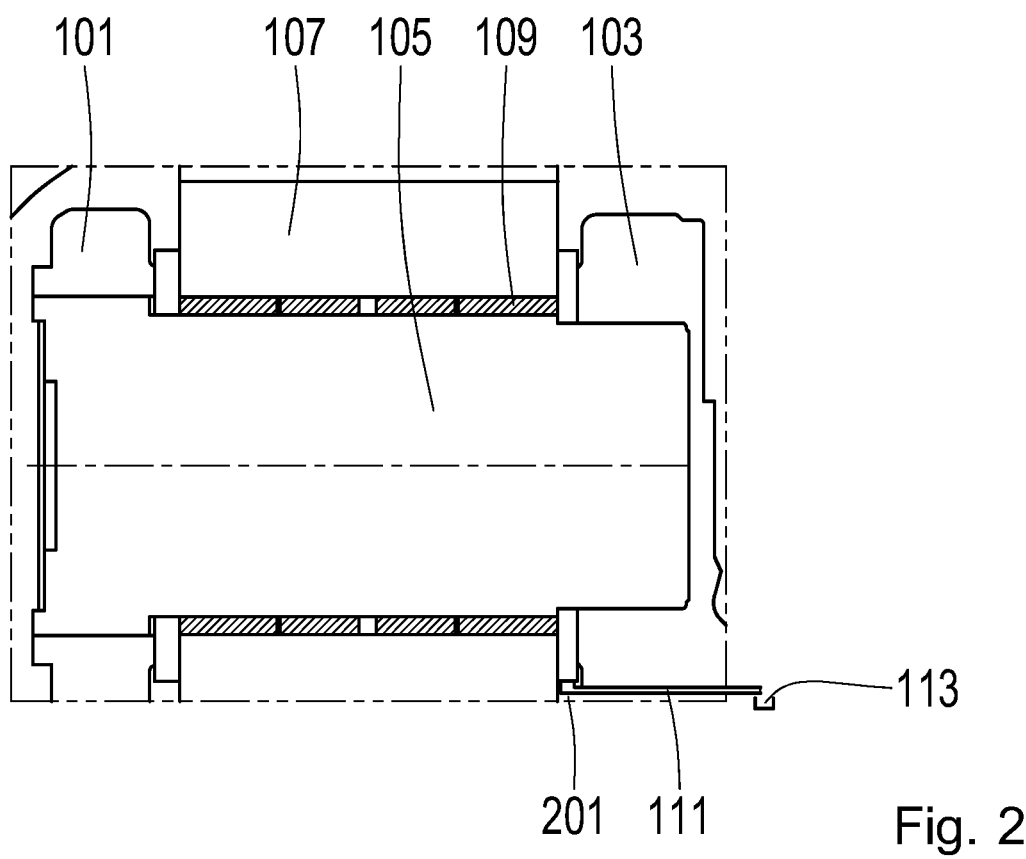
FIG. 2 shows a further arrangement having a collecting ring.

FIGS. 1 and 2 illustrate a first flange 101 and a second flange 103 of a planetary carrier. The flanges 101, 103 each form a pin seat. Opposite ends of a planetary pin 105 are fixed in both pin seats. A planetary gear 107 is rotatably supported on the planetary pin 105 by means of a plain bearing 109.

The second flange 103 of the planetary carrier has a conduit 111. This serves to discharge lubricant from the plain bearing 109. On the outlet side of the conduit 111 there is a channel 113 into which the lubricant is introduced.

As shown in FIG. 1, the conduit 111 is guided directly to a bearing gap of the plain bearing 109, such that there is a lubricant transfer from the bearing gap to the conduit 111. Alternatively, as shown in FIG. 2, lubricant exiting the bearing gap can be collected in a further channel 201, which is connected to the conduit 111 in a lubricant-conducting manner.

Figure 3:
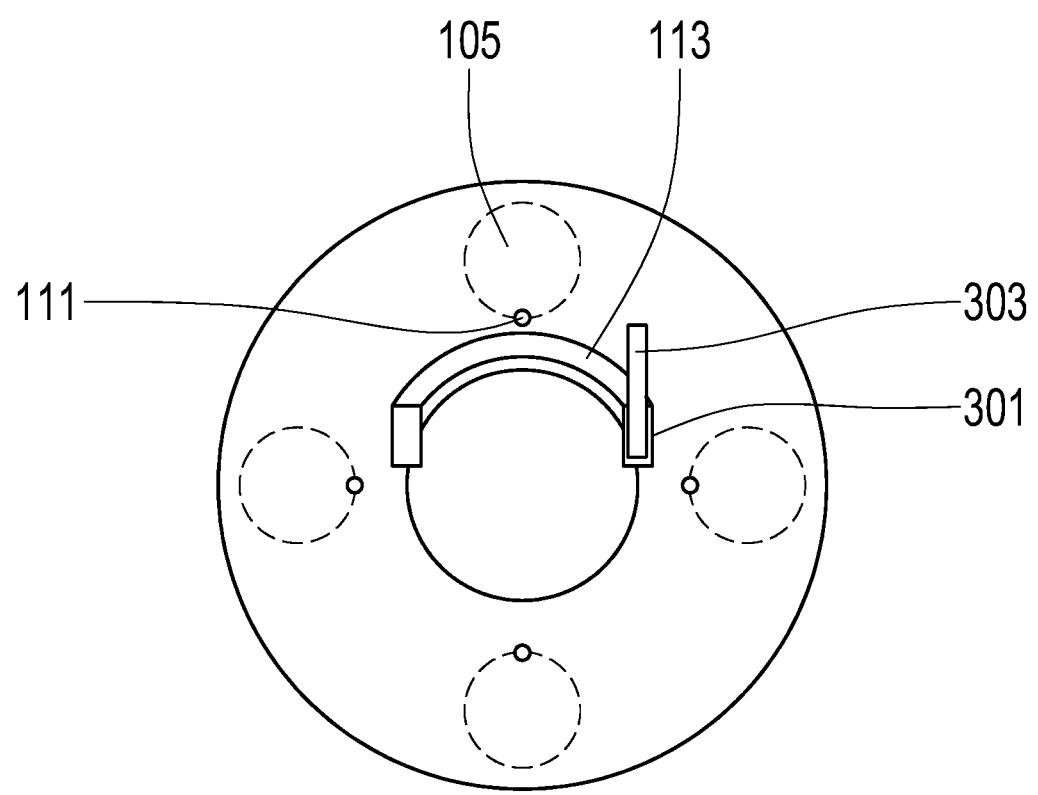
FIG. 3 shows a collecting ring having a collecting vessel.

FIG. 3 shows a side view of the second flange 103 of the planetary carrier. Here, it can be seen that the conduit 111 runs along the top of the channel 113 when the planetary carrier rotates, such that lubricant exiting the conduit 111 drips into the channel 113. From the channel 113, the lubricant enters a collecting vessel 301. A sensor 303 is arranged in the collecting vessel 301 and measures a physical variable of the lubricant that is situated in the collecting vessel 301.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

101 First flange of a planetary carrier
103 Second flange of a planetary carrier
105 Planetary pin
107 Planetary gear 109 Plain bearing
111 Conduit
113 Channel
201 Channel
301 Collecting vessel
303 Sensor

The invention claimed is:

1. A system comprising:
a bearing;
a lubricant line configured to introduce lubricant from a bearing gap of the bearing into a vessel;
a sensor arranged in the vessel and configured to measure at least one physical variable of lubricant that is situated within the vessel;
a lubricant sump; and
a device for introducing lubricant from the lubricant sump into the bearing gap of the bearing,
wherein the vessel comprises an outlet or overflow.

2. The system according to claim 1, wherein the outlet or overflow is arranged in such a way that lubricant exiting the vessel via the outlet or overflow enters the lubricant sump.

3. The system according to claim 1, further comprising a planetary carrier and a planetary gear; wherein the planetary gear is rotatably supported in the planetary carrier by means of the bearing;
wherein the planetary carrier forms at least part of the lubricant line, or at least part of the lubricant line is fixed to the planetary carrier.

4. The system according to claim 3, further comprising a collecting device and a lubricant-conducting connection from the collecting device to the vessel; wherein the collecting device is arranged in such a way that it collects lubricant exiting the lubricant line at at least one rotational angle position of the planetary carrier.

5. The system according to claim 1, wherein at least a part of the lubricant line comprises a thermally insulating material.

6. The system according to claim 1, further comprising a further lubricant line, a further vessel and a further sensor; wherein the further lubricant line is designed to introduce lubricant from the bearing gap of the bearing into the further vessel; wherein the further sensor is designed to measure at least one physical variable of lubricant that is situated in the further vessel.

7. A system comprising:
a bearing;
a lubricant line configured to introduce lubricant from a bearing gap of the bearing into a vessel;
a sensor configured to measure at least one physical variable of lubricant that is situated in the vessel;
a planetary carrier, wherein the planetary carrier forms at least part of the lubricant line or at least part of the lubricant line is fixed to the planetary carrier; and
a planetary gear, wherein the planetary gear is rotatably supported in the planetary carrier by means of the bearing.

8. The system according to claim 7, wherein the vessel comprises an outlet or overflow.

9. The system according to claim 8, further comprising a lubricant sump and a device for introducing lubricant from the lubricant sump into the bearing gap of the bearing.

10. The system according to claim 7, further comprising a collecting device and a lubricant-conducting connection from the collecting device to the vessel; wherein the collecting device is arranged in such a way that it collects lubricant exiting the lubricant line at at least one rotational angle position of the planetary carrier.

11. The system according to claim 7, wherein at least a part of the lubricant line comprises a thermally insulating material.

12. The system according to claim 7, further comprising a further lubricant line, a further vessel and a further sensor; wherein the further lubricant line is designed to introduce lubricant from the bearing gap of the bearing into the further vessel; wherein the further sensor is designed to measure at least one physical variable of lubricant that is situated in the further vessel.

13. A system comprising:
a bearing;
a lubricant line configured to introduce lubricant from a bearing gap of the bearing into a vessel; and
a sensor configured to measure at least one physical variable of lubricant that is situated in the vessel,
wherein at least a part of the lubricant line comprises a thermally insulating material.

14. The system according to claim 13, wherein the vessel comprises an outlet or overflow.

15. The system according to claim 14, further comprising a lubricant sump and a device for introducing lubricant from the lubricant sump into the bearing gap of the bearing.

16. The system according to claim 13, further comprising a planetary carrier and a planetary gear;
wherein the planetary gear is rotatably supported in the planetary carrier by means of the bearing; and
wherein the planetary carrier forms at least part of the lubricant line, or at least part of the lubricant line is fixed to the planetary carrier.

17. The system according to claim 16, further comprising a collecting device and a lubricant-conducting connection from the collecting device to the vessel; wherein the collecting device is arranged in such a way that it collects lubricant exiting the lubricant line at at least one rotational angle position of the planetary carrier.

18. The system according to claim 13, further comprising a further lubricant line, a further vessel and a further sensor; wherein the further lubricant line is designed to introduce lubricant from the bearing gap of the bearing into the further vessel; wherein the further sensor is designed to measure at least one physical variable of lubricant that is situated in the further vessel.

* * * * *